(12) United States Patent
Takahashi et al.

(10) Patent No.: US 9,037,871 B2
(45) Date of Patent: May 19, 2015

(54) IMAGE PROCESSING APPARATUS AND IMAGE PROCESSING METHOD

(71) Applicant: FUJITSU LIMITED, Kawasaki-shi, Kanagawa (JP)

(72) Inventors: Jun Takahashi, Kawasaki (JP); Shohei Nakagata, Kawasaki (JP); Kensuke Kuraki, Ichikawa (JP); Taizo Anan, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 14/030,629

(22) Filed: Sep. 18, 2013

(65) Prior Publication Data
US 2014/0016775 A1 Jan. 16, 2014

Related U.S. Application Data

(63) Continuation of application No. PCT/JP2011/056615, filed on Mar. 18, 2011.

(51) Int. Cl.
*G06F 21/00* (2013.01)
*H04L 9/28* (2006.01)
*H04N 1/32* (2006.01)
*H04N 1/44* (2006.01)

(52) U.S. Cl.
CPC .............. *H04L 9/28* (2013.01); *H04N 1/32224* (2013.01); *H04N 1/32229* (2013.01); *H04N 1/32309* (2013.01); *H04N 1/448* (2013.01)

(58) Field of Classification Search
CPC .................................................. H04N 1/32229
USPC ............................................................. 726/2
See application file for complete search history.

(56) References Cited

U.S. PATENT DOCUMENTS 5,237,624 A * 8/1993 Okamoto et al. ............. 382/242
5,491,563 A 2/1996 Pomerantz
5,726,435 A 3/1998 Hara et al.
(Continued)

FOREIGN PATENT DOCUMENTS

JP  7-254037  10/1995
JP  9-504660  5/1997
(Continued)

OTHER PUBLICATIONS

International Search Report mailed Apr. 19, 2011 in corresponding International Application No. PCT/JP2011/056615.

*Primary Examiner* — Morshed Mehedi
(74) *Attorney, Agent, or Firm* — Staas & Halsey LLP

(57) ABSTRACT

An image processing apparatus includes: a dividing unit dividing at least one region on a digitalized image into multiple blocks; a scrambling unit producing an encrypted image by rearranging each block; a pixel value judging unit judging, for each block on the encrypted image, whether a difference between a statistically representative value of a pixel value of a first region included in the block and a statistically representative value of a pixel value of a second region is no smaller than a predetermined value, the second region being included in a block adjacent to the block and being adjacent to the first region; and a pixel value converting unit converting the pixel value of the first region in each block having the difference smaller than the predetermined value, while not converting the pixel value of the first region in each block having the difference no smaller than the predetermined value.

11 Claims, 10 Drawing Sheets

(56) References Cited

U.S. PATENT DOCUMENTS

| | | | |
|---|---|---|---|
| 7,937,588 B2* | 5/2011 | Picard et al. | 713/176 |
| 2005/0177737 A1* | 8/2005 | Takeda et al. | 713/189 |
| 2005/0232515 A1* | 10/2005 | Chae | 382/300 |
| 2007/0140560 A1* | 6/2007 | Katsuyama et al. | 382/176 |
| 2008/0130761 A1* | 6/2008 | Kadono et al. | 375/240.27 |
| 2009/0123040 A1* | 5/2009 | Tatara | 382/125 |
| 2009/0142000 A1* | 6/2009 | Sono | 382/274 |
| 2009/0245513 A1 | 10/2009 | Takahashi et al. | |
| 2009/0257586 A1* | 10/2009 | Takahashi et al. | 380/55 |
| 2009/0323950 A1 | 12/2009 | Nakagata et al. | |
| 2011/0103488 A1* | 5/2011 | Xue et al. | 375/240.16 |

FOREIGN PATENT DOCUMENTS

| | | |
|---|---|---|
| JP | 2008-301044 | 12/2008 |
| JP | 2009-232129 | 10/2009 |
| JP | 2009-244775 | 10/2009 |

* cited by examiner

FIG.3
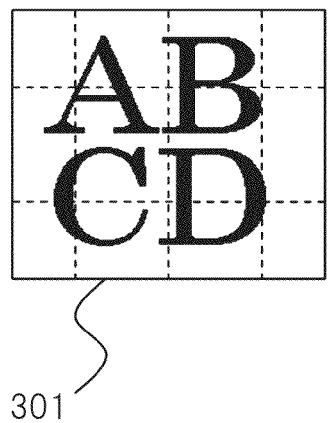
301
FIG.4A
| 1 | 2 | 3 | 4 |
|---|---|---|---|
| 5 | 6 | 7 | 8 |
| 9 | 10 | 11 | 12 |
401
FIG.4B
| 7 | 1 | 8 | 2 |
|---|---|---|---|
| 9 | 3 | 10 | 4 |
| 11 | 5 | 12 | 6 |
402
FIG.4C
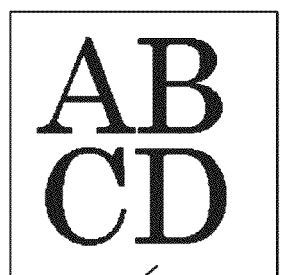
403
FIG.4D
404

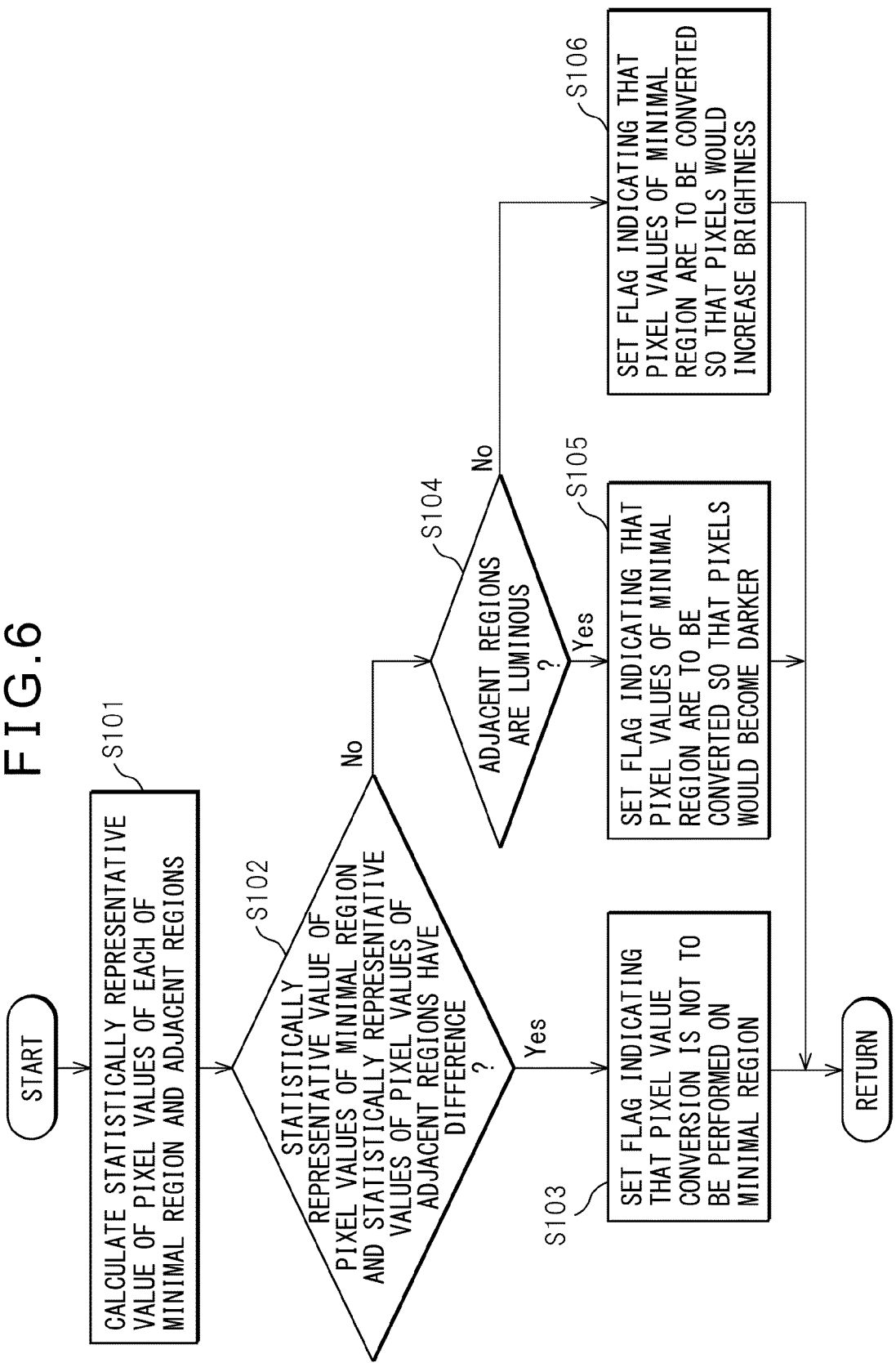

FIG.12A

| -1 | 0 | 1 |
|---|---|---|
| -1 | 0 | 1 |
| -1 | 0 | 1 |

| -1 | -1 | -1 |
|---|---|---|
| 0 | 0 | 0 |
| 1 | 1 | 1 |

| $n_3$ | $n_2$ | $n_1$ |
|---|---|---|
| $n_4$ | P | $n_0$ |
| $n_5$ | $n_6$ | $n_7$ |

1300

IMAGE PROCESSING APPARATUS AND IMAGE PROCESSING METHOD

CROSS-REFERENCE TO RELATED APPLICATION

This application is a continuation application and is based upon PCT/JP2011/056615, filed on Mar. 18, 2011, the entire contents of which are incorporated herein by reference.

FIELD

The embodiments discussed herein are related to an image processing apparatus and an image processing method for encrypting a digitalized image.

BACKGROUND

In recent years, a technology has been developed that prevents leakage of confidential information recorded on a medium such as paper. Particular examples of the technology that have been proposed are a technique for embedding encoded information into an image, and a technique for encrypting in advance a digitalized image that cannot be seen by the general public and then printing the encrypted image on a medium (for example, refer to Japanese Laid-open Patent Publication No. H07-254037 and Japanese Laid-open Patent Publication No. 2008-301044). For example, according to the technique disclosed in Japanese Laid-open Patent Publication No. H07-254037, a two-dimensional code is provided including position specifying symbols, a data region, timing cells, and a vertex detection cell that are arranged two-dimensionally according to a predetermined arrangement order.

In the technique disclosed in Japanese Laid-open Patent Publication No. 2008-301044, an encryption apparatus rearranges on a block-by-block basis, pixels in an encryption target region of an inputted image according to a predetermined encryption key. The encryption apparatus also adds a position specifying marker for specifying the encrypted region, to each of at least two of the four corners of the encrypted region. Further, the encryption apparatus adds a check marker for checking the validity of a decrypted image to be produced by decrypting the encrypted region. A decryption apparatus of this technique digitalizes the image including the encrypted region by reading the medium on which the image is printed, by using a reader such as a scanner or a digital camera. The decryption apparatus then decrypts the encrypted region by referring to the position specifying markers in the digitalized image, and thereby obtains the source image.

When an encrypted image produced by using such a technique for encrypting or encoding part of the information of the source image is printed on a medium, it is preferable that the encrypted image be readable by commonly-used readers such as scanners and cameras integrated in mobile phones. In decrypting the encrypted image read by a reader and then re-digitalized, it is preferable that the position of each block be detectable in the re-digitalized encrypted image. To enable this, techniques for adding, to an encrypted image, information for specifying the position of each block have been proposed (for example, refer to Published Japanese Translation of PCT International Publication for Patent Application (Kohyo) No. H09-504660 and Japanese Laid-open Patent Publication No. 2009-232129).

For example, the technique disclosed in Published Japanese Translation of PCT International Publication for Patent Application (Kohyo) No. H09-504660, proposes that reference marks are included in a document that are used for at least one operation including registration, scaling, rotation, shifting, and defect compensation in descrambling.

In addition, according to the technique disclosed in Japanese Laid-open Patent Publication No. 2009-232129, an image processing apparatus divides an image into a plurality of small regions, rearranges the small regions, and then converts the values of pixels constituting a part of each small region. This conversion facilitates detection of the position of each small region.

In the above known techniques, the position of each block is made detectable by inverting or shifting the values of the pixels in particular blocks, or inverting or shifting the values of at least some of the pixels in each block. However, when an image is compressed according to an image compression standard, such as JPEG, or as for the original values of the pixels in an encrypted image are converted by scanning a printed image, it may be difficult for the decryption apparatus to decrypt an encrypted image to reproduce the original values of the pixels. As a result, the image quality of the decrypted image reproduced by decrypting the encrypted image is degraded. Thus, an image obtained through decryption is likely to have lower image quality when block-position specifying information is added to an encrypted image by converting the values of pixels. For this reason, it is preferable to prevent position specifying information from being added if possible, or to add such information only to part of each block. When position specifying information is not added to an encrypted image, on the other hand, it is difficult for the decryption apparatus to detect the accurate position of each block, which also results in the problem that the image quality of the image produced by decryption is degraded.

SUMMARY

According to one embodiment, an image processing apparatus is provided. The image processing apparatus includes: a dividing unit which divides at least one region on a digitalized image into a plurality of blocks; a scrambling unit which produces an encrypted image by rearranging the plurality of blocks according to a predetermined rule; a pixel value judging unit which judges, for each of the plurality of blocks on the encrypted image, whether or not a difference between a statistically representative value of a pixel value of a first region and a statistically representative value of a pixel value of a second region is no smaller than a predetermined value, the first region being included in the block, the second region being included in a block adjacent to the block and being adjacent to the first region; and a pixel value converting unit which converts the pixel value of the first region included in each block whose difference between the statistically representative value of the pixel value of the first region and the statistically representative value of the pixel value of the second region is smaller than the predetermined value among the plurality of blocks on the encrypted image, while not converting the pixel value of the first region included in each block having the difference no smaller than the predetermined value among the plurality of blocks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating one example of blocks defined in an encryption region.

FIG. 4A is a diagram illustrating one example of respective block positions in the encryption region before scrambling.

FIG. 4B is a diagram illustrating one example of respective block positions in the encryption region after scrambling.

FIG. 4C is a diagram illustrating one example of a source image before scrambling.

FIG. 4D is a diagram illustrating an encrypted image produced by performing scrambling on the source image depicted in FIG. 4C according to the block rearrangement rule illustrated in FIG. 4A and FIG. 4B.

FIG. 6 is an operation flowchart illustrating a pixel value judging process.

FIG. 12A and FIG. 12B are each a diagram illustrating one example of an edge detection filter.

FIG. 13 is a diagram illustrating one example of an interpolation filter.

DESCRIPTION OF EMBODIMENTS

Image processing apparatus according to various embodiments will be described below with reference to the drawings. According to the image processing apparatus described herein, a digitalized source image to be encrypted is divided into a plurality of blocks, and the blocks are rearranged according to a predetermined rule, thereby encrypting the source image. In the encryption process, the image processing apparatus converts the values of some pixels in particular blocks. Specifically, the image processing apparatus performs pixel value conversion only for each of the blocks having a boundary difficult to be detected due to a small difference in pixel value between the block and an adjacent block, among the blocks rearranged by scrambling. In this way, the image processing apparatus reduces the number of pixels to be subjected to pixel value conversion. This enables a decryption apparatus to detect the individual block positions while suppressing the degradation of the image quality of a decrypted image due to pixel value conversion. It is to be noted that an image produced by encryption is simply referred to as an "encrypted image" in this specification.

Figure 1:
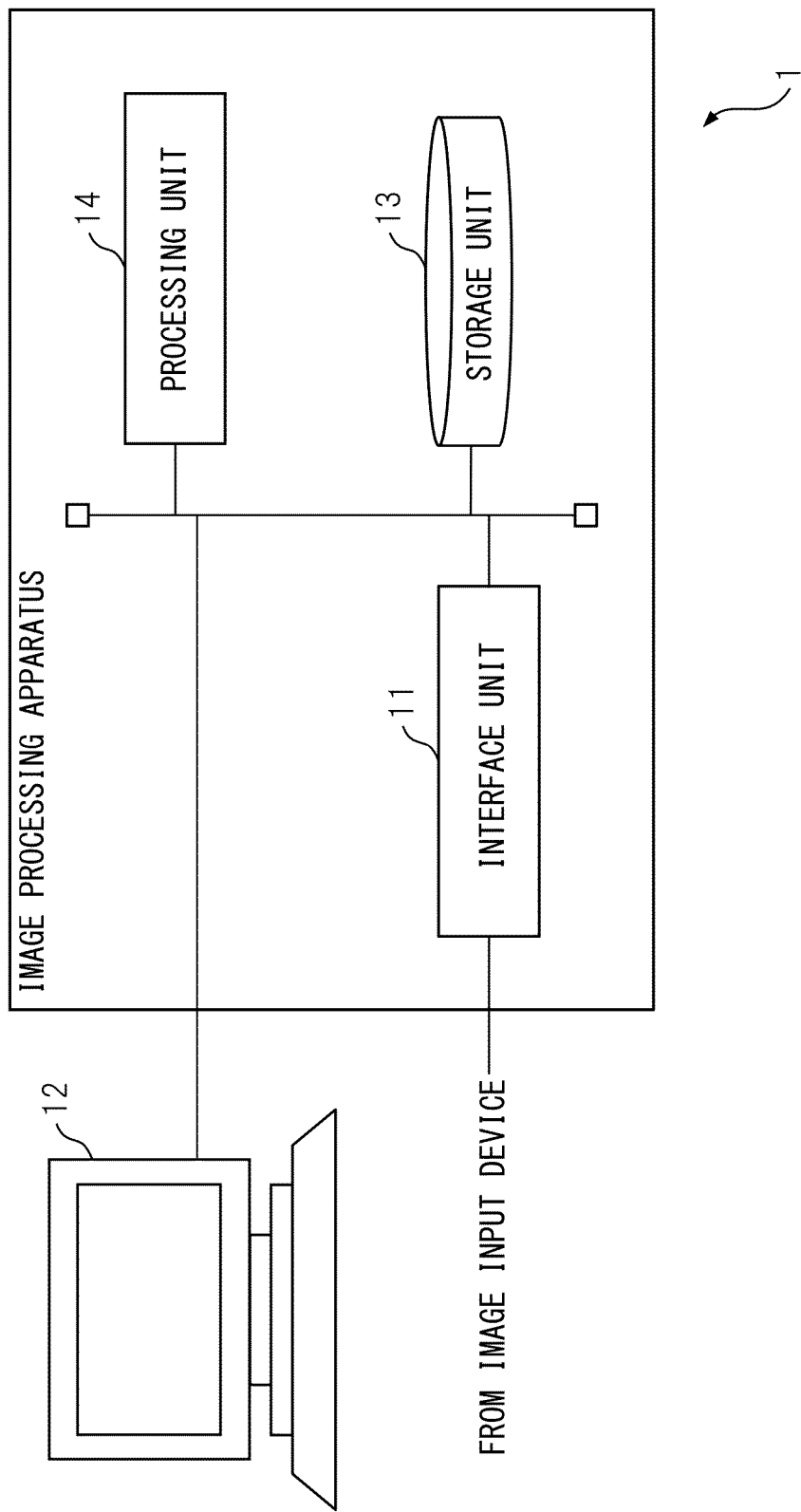
FIG. 1 is a diagram illustrating in simplified form the configuration of an image processing apparatus according to a first embodiment.

FIG. 1 is a diagram illustrating in simplified form the configuration of an image processing apparatus according to a first embodiment. The image processing apparatus 1 includes an interface unit 11, a user interface unit 12, a storage unit 13, and a processing unit 14. The image processing apparatus 1 encrypts a source image acquired via the interface unit 11.

The interface unit 11 includes, for example, a communication interface that connects the image processing apparatus 1 to an image input device such as a digital camera or a mobile phone with a built-in camera (not depicted), and a control circuit for the communication interface. The communication interface may be an interface conforming to a communication standard such as the Universal Serial Bus (USB) or the Small Computer System Interface (SCSI), for example. Alternatively, the interface unit 11 may include a communication interface for connecting the image processing apparatus 1 to a communication network conforming to a communication standard such as the Ethernet (registered trademark), and a control circuit for the communication interface. The interface unit 11 acquires a digitalized image from the image input device or other apparatus connected to the communication network, and passes the image to the processing unit 14.

The image processing apparatus 1 may also be connected to an output device, such as a printer, via the interface unit 11. In this case, the interface unit 11 may, for example, receive from the processing unit 14 an encrypted image including an encryption region that is defined in the source image and is encrypted, and output the encrypted image to the output device. Alternatively, the interface unit 11 may transmit the encrypted image to another apparatus connected to the image processing apparatus 1 via the communication network.

The user interface unit 12 includes a keyboard or a pointing device such as a mouse, for example. The user interface unit 12 may also include a display device, such as a liquid crystal display, for displaying an image. In this case, for example, when a region of the image displayed on the display device is selected by a mouse in accordance with a user operation, the user interface unit 12 acquires information indicating the specified region of the image, e.g., the coordinates of the upper left end and the lower right end of the specified region. Then, the user interface unit 12 notifies the processing unit 14 of the information indicating the specified region.

The storage unit 13 includes at least one device selected, for example, from among a semiconductor memory device, a magnetic disk device, and an optical disk device. The storage unit 13 stores a computer program to be executed on the processing unit 14 and various kinds of information to be used in order to encrypt an image. Further, the storage unit 13 stores the source image to be subjected to encryption. The source image may be acquired via the interface unit 11 as described above. Alternatively, the source image may be created by an application program executed on the processing unit 14.

The processing unit 14 includes one or a plurality of processors and peripheral circuitry thereof. The processing unit 14 encrypts the encryption region specified on the digitalized image.

Figure 2:
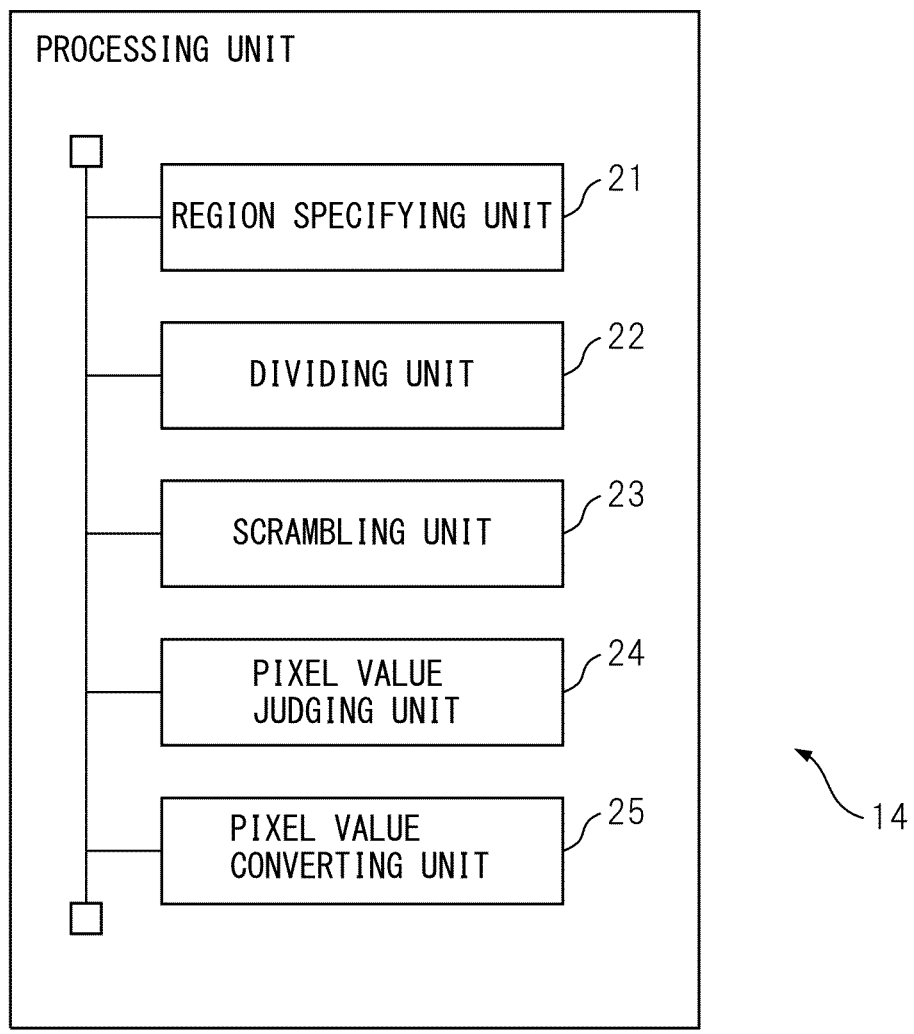
FIG. 2 is a block diagram illustrating the functions that a processing unit according to the first embodiment implements in order to encrypt a source image.

FIG. 2 is a block diagram illustrating the functions that the processing unit 14 implements for a process of encrypting an image. The processing unit 14 includes a region specifying unit 21, a dividing unit 22, a scrambling unit 23, a pixel value judging unit 24, and a pixel value converting unit 25. These units constituting the processing unit 14 are functional modules implemented by executing a computer program on a processor incorporated in the processing unit 14. These units constituting the processing unit 14 may be incorporated in the image processing apparatus 1 as circuits for implementing the functions of the respective units or an integrated circuit with these circuits integrated therein.

The region specifying unit 21 sets an encryption region to be encrypted, in a source image. The region specifying unit 21, for example, receives information indicating a certain region on the source image, from the user interface unit 12, and thereby sets the certain region as an encryption region. When the certain region informed by the user interface unit 12 includes a region outside the image, the region specifying unit 21 may cause the user interface unit 12 to display a warning message indicating that a region outside the image is selected. Alternatively, the storage unit 13 may store a predetermined template, and the region specifying unit 21 may specify the region of the image corresponding to the template as the encryption region. The region specifying unit 21 then notifies the dividing unit 22 of information indicating the encryption region, e.g., the coordinates of the upper left end and the lower right end of the encryption region. When the encryption region is the entire image, the region specifying unit 21 may be omitted.

The dividing unit 22 divides the encryption region specified by the region specifying unit 21, into a plurality of rectangular blocks, and then assigns unique numbers to the respective blocks. The blocks are each a region used as a unit when the scrambling unit 23 to be described later performs position rearrangement.

FIG. 3 depicts an example of blocks defined in an encryption region. An encryption region 301 is divided into a total of 12 blocks, i.e., three blocks vertically and four blocks horizontally, for example. The blocks are assigned with respective numbers 1 to 12 in a predetermined order, e.g., a raster scan order. Specifically, the block in the upper left end of the encryption region 301 is assigned with the number "1", and the block in the lower right end of the encryption region 301 is assigned with the number "12", for example. It is to be noted that, although dotted lines are presented in the encryption region 301 in FIG. 3 to make the block boundaries visible, the dotted lines are used only to illustrate the relationship between the encryption region and the blocks and are not added to the encryption region in the actual process.

Then, the dividing unit 22 notifies the scrambling unit 23 of the information indicating the ranges of the respective blocks or the boundaries between each two of the blocks as well as the numbers assigned to the respective blocks.

The scrambling unit 23 performs scrambling to rearrange the blocks according to a predetermined rearrangement rule determined by using an encryption key. For this purpose, the scrambling unit 23 constructs from the encryption key a mapping table that provides a mapping of block positions before and after the transformation. For example, suppose that the block position number after the transformation is designated by x, and the block position number before the transformation by y. The block mapping equation used for the scrambling is as the follows.

$$y = (px) \bmod q \tag{1}$$

In equation (1), p and q are primes that the encryption key expresses, and p≠q. For example, when determining p=7 and q=13 determined by using the encryption key, the relationship between x and y is as presented in Table 1.

TABLE 1

| x | | | | | | | | | | | | |
|---|---|---|---|---|---|---|---|---|---|---|---|---|
|   | 1 | 2 | 3 | 4 | 5 | 6 | 7 | 8 | 9 | 10 | 11 | 12 |
| y | 7 | 1 | 8 | 2 | 9 | 3 | 10 | 4 | 11 | 5 | 12 | 6 |

In this case, as presented in Table 1, when x is 1, the corresponding value of y is 7. Therefore, the scrambling unit 23 performs scrambling so that the block whose block number y before the transformation is 7 is moved to the position of the block whose block number x after the transformation is 1.

FIG. 4A depicts block positions in an encryption region before scrambling for the case of p=7 and q=13 in equation (1) when the encryption region is divided into three blocks vertically and four blocks horizontally, and FIG. 4B depicts the block positions in the encryption region after the scrambling. Further, FIG. 4C depicts a source image before the scrambling is applied thereto, and FIG. 4D is a diagram illustrating an encrypted image produced by applying the scrambling to the source image depicted in FIG. 4C, in accordance with the block rearrangement rule illustrated in FIG. 4A and FIG. 4B.

In FIG. 4A, the number contained in each block in an encryption region 401 before scrambling indicates the number of that block. Similarly, in FIG. 4B, the number contained in each block in an encryption region 402 after the scrambling indicates the number of that block. As a result of the scrambling based on the mapping of the blocks before and after the scrambling depicted in FIG. 4A and FIG. 4B, a source image 403 depicted in FIG. 4C is transformed to an encrypted image 404 depicted in FIG. 4D.

The scrambling unit 23 passes the encrypted image including the encryption region after the scrambling, to the pixel value judging unit 24.

The pixel value judging unit 24 judges, for each of the blocks on the encrypted image, whether or not to convert the values of the pixels in a minimal region defined contiguous to the boundaries of the adjacent blocks, in order to make the block position detectable. In this embodiment, the minimal region is a region located at one of the corners (for example, the upper left corner) of each block and consisting of one pixel vertically and one pixel horizontally, or two pixels vertically and two pixels horizontally, for example. The pixel value judging unit 24 judges whether or not to convert the pixel values in the minimal region, on the basis of the difference between the statistically representative value of the pixel values of the minimal region and the statistically representative value of the pixel values of the adjacent regions. The adjacent regions are each a region that is adjacent to the minimal region having a block boundary therebetween.

Figure 5:
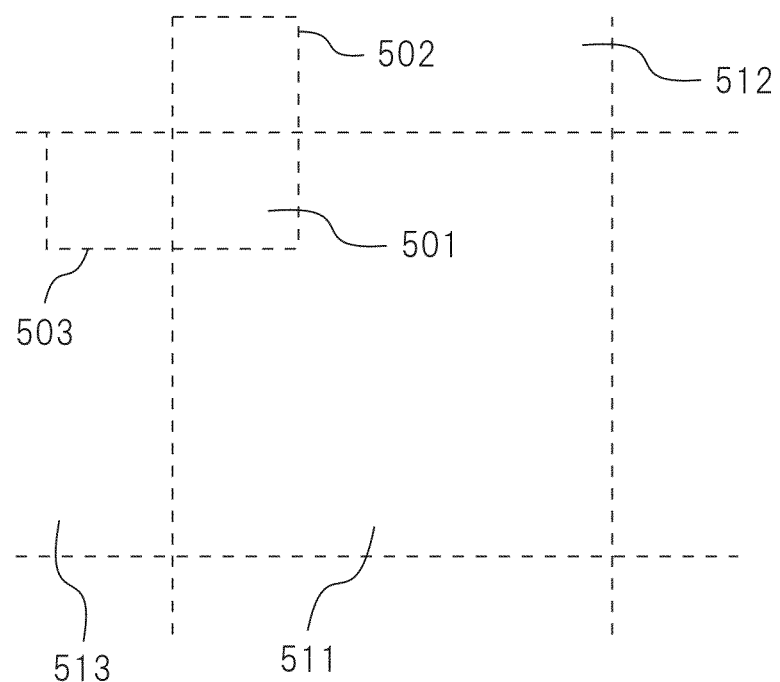
FIG. 5 is a diagram illustrating one example of the arrangement of a minimal region and adjacent regions.

FIG. 5 is a diagram illustrating one example of the arrangement of a minimal region and adjacent regions. In FIG. 5, a minimal region 501 is defined at the upper left end corner of a target block 511. Accordingly, for the minimal region 501, two adjacent regions 502 and 503 are defined. The adjacent region 502 is adjacent to the upper end of the minimal region 501, and is a part of a block 512 adjacent to the upper side of the target block 511. The adjacent region 503 is adjacent to the left end of the minimal region 501, and a part of a block 513 is adjacent to the left side of the target block 511. In this example, the shape and size of the adjacent regions 502 and 503 are equal to those of the minimal region 501. However, the shape and size of the adjacent regions 502 and 503 may be different from those of the minimal region 501. For example, the height of the adjacent region 502 may be half or twice the height of the minimal region 501. Similarly, the width of the adjacent region 503 may be half or twice the width of the minimal region 501.

FIG. 6 is an operation flowchart illustrating a pixel value judging process carried out by the pixel value judging unit 24. The pixel value judging unit 24 carries out the pixel value judging process for each block.

First, the pixel value judging unit 24 calculates a statistically representative value of the pixel values of the minimal region and a statistically representative value of the pixel values of an adjacent region in each block of which is adjacent to the minimal region having a block boundary therebetween (step S101).

The statistically representative value of the pixel values of each target region may be the average value, the most-frequent value, the minimum value, or the maximum value of the pixel values of the region, for example. When the source image is a gray image, the pixel value judging unit 24 calculates the statistically representative value from the pixel values of the region. When the source image is a color image and each pixel value is set for each of the red component, the green component, and the blue component, the statistically representative value of the pixel values of the region may be calculated by using the value of one of the color components as each pixel value. Alternatively, the pixel value judging unit 24 may calculate the statistically representative value by using, as each pixel value, one of the following values, i.e., a luminance value Y, color differences $C_1$ and $C_2$, hue H, and saturation S, of each of the pixels in the minimal region and the adjacent regions, according to a corresponding one of the following equations.

$$Y = 0.299R + 0.587G + 0.114B$$

$$C_1 = 0.710R - 0.587G - 0.114B$$

$$C_2 = -0.299R - 0.587G + 0.886B$$

$$H = \tan^{-1}(C_1/C_2)$$

$$S = \sqrt{C_1^2 + C_2^2} \quad (2)$$

In equations (2), R, G, and B respectively denote the red component value, the green component value, and the blue component value of a pixel, and are each expressed by a value in the range from 0 to 255, for example. When each of the minimal region and the adjacent regions is consisted only of one pixel, the statistically representative value of the pixel value of each of the minimal region and the adjacent regions is the pixel value itself of the corresponding one of the minimal region and the adjacent regions.

The pixel value judging unit 24 judges whether or not there is a difference between the statistically representative value of the pixel values of the minimal region and the statistically representative values of the pixel values of the adjacent regions (step S102). For example, when the statistically representative value of the pixel values of the minimal region and the statistically representative values of the pixel values of the adjacent regions satisfy the condition represented by the following equation, the pixel value judging unit 24 judges that the statistically representative values have a difference.

$$|A-B| + |A-C| \geq Th0 \quad (3)$$

In equation (3), A denotes the statistically representative value of the pixel values of the minimal region. Further, B denotes the statistically representative value of the pixel values of the adjacent region vertically adjacent to the minimal region, and C denotes the statistically representative value of the pixel values of the adjacent region horizontally adjacent to the minimal region. In addition, Th0 denotes a threshold value. The threshold value Th0 may be a fixed value that is set in advance. When a pixel value is expressed by a value in the range from 0 to 255, the threshold value Th0 is set at 32, for example. Alternatively, the pixel value judging unit 24 may set the threshold value Th0 dynamically, on the basis of the source image. In this case, for example, the pixel value judging unit 24 may set, as the threshold value Th0, the value obtained by multiplying the difference between the maximum pixel value and the minimum pixel value of the source image or the encryption region, by a predetermined factor smaller than 1 (e.g., 0.25).

When there is a difference between the statistically representative value of the pixel values of the minimal region and the statistically representative values of the pixel values of the adjacent regions (Yes in step S102), it is estimated that a decryption apparatus can detect the boundary between the target block and each of the adjacent blocks having the respective adjacent regions defined therein. As a result, the pixel value judging unit 24 sets a flag indicating that pixel value conversion is not to be applied to the minimal region (step S103).

When the statistically representative value of the pixel values of the minimal region and the statistically representative values of the pixel values of the adjacent regions do not have a difference (No in step S102), on the other hand, it may be difficult for the decryption apparatus to detect the boundary between the target block and each of the adjacent blocks having the respective adjacent regions defined therein. In this case, the pixel value judging unit 24 judges whether or not the adjacent regions are luminous, in order to determine which conversion is to be performed on the pixel values in the minimal region (step S104).

For example, suppose that a higher pixel value indicates a more luminous pixel (i.e., a whiter pixel). In this case, the pixel value judging unit 24 judges that the adjacent regions are luminous, when the average values of the pixel values of the adjacent regions satisfy the condition represented by the following equation.

$$B + C > Th1 \quad (4)$$

In equation (4), B denotes the average value of the pixel values of the adjacent region vertically adjacent to the minimal region, and C denotes the average value of the pixel values of the adjacent region horizontally adjacent to the minimal region. In addition, Th1 denotes a threshold value. The threshold value Th1 may be a fixed value that is set in advance. When a pixel value is expressed by a value in the range from 0 to 255, the threshold value Th1 is set at 160, for example. Alternatively, the pixel value judging unit 24 may set the threshold value Th1 dynamically, on the basis of the source image. In this case, the pixel value judging unit 24 may set, as the threshold value Th1, a value determined by applying, for example, the discriminant analysis method (Otsu's method) to the entire source image or the encryption region. Alternatively, the pixel value judging unit 24 may set, as the threshold value Th1, the average pixel value of the entire source image or the encryption region. Furthermore, the pixel value judging unit 24 may set, as the threshold value Th1, the statistically representative value, such as the average pixel value or the most-frequent pixel value, of the minimal region.

When the adjacent regions are luminous (Yes in step S104), the pixel value judging unit 24 sets a flag indicating that the pixel values of the minimal region are to be set so that the corresponding pixels would become darker (step S105). On the other hand, when the adjacent regions are dark (No in step S104), the pixel value judging unit 24 sets a flag indicating that the pixel values of the minimal region are to be set so that the corresponding pixels would increase brightness (step S106). After the one of steps S103, S105, and S106, the pixel value judging unit 24 notifies the pixel value converting unit 25 of the flag set for the minimal region and the position or the number of the corresponding block, and then terminates the pixel value judging process.

The pixel value converting unit 25 converts the pixel values of the minimal region for which the flag indicating the pixel values are to be set so that the corresponding pixels would become darker or increase brightness is notified by the pixel value judging unit 24. For example, when the pixel value is expressed by a value in the range from 0 to 255 and a higher pixel value indicates a more bright pixel, the pixel value converting unit 25 sets each of the pixel values of the minimal region for which the flag indicating that the pixel values are to be set so that the corresponding blocks would become darker is notified, at a value lower than the above threshold value Th1, e.g., 0. By contrast, the pixel value converting unit 25 sets each of the pixel values of the minimal region for which the flag indicating that the pixel values are to be set so that the corresponding pixels would increase brightness is notified, at a value higher than the above threshold value Th1, e.g., 255.

When the image to be encrypted is a color image, the pixel value converting unit 25 may set, at 0, each of the values of all the color components or one or two particular color components of the minimal region for which the flag indicating that the pixel values are to be set so that the corresponding pixels would become darker is notified. Similarly, the pixel value converting unit 25 may set, at 255, each of the values of all the color components or one or two particular color components of the minimal region for which the flag indicating that the pixel values are to be set so that the corresponding pixels would increase brightness is notified. When only the values of particular color components are converted, the particular color components preferably include color components used by the pixel value judging unit 24 for the comparison between the statistically representative value of the pixel values of the minimal region and the statistically representative values of the pixel values of the adjacent regions.

Figure 7A:
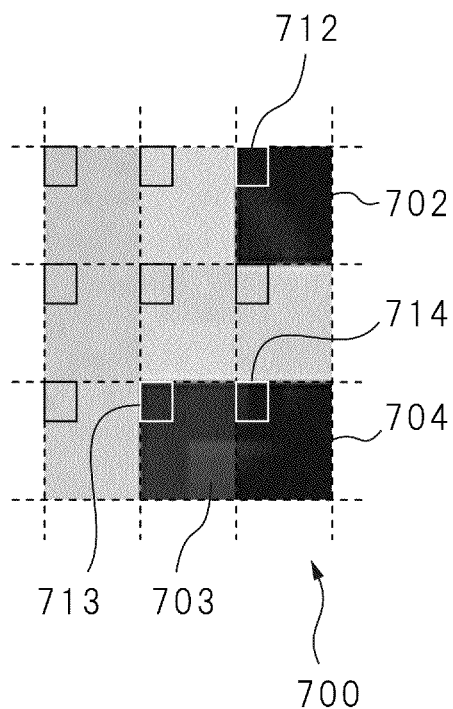
FIG. 7A is a diagram illustrating one example of an encrypted image produced by scrambling and minimal regions defined in respective blocks.
Figure 7B:
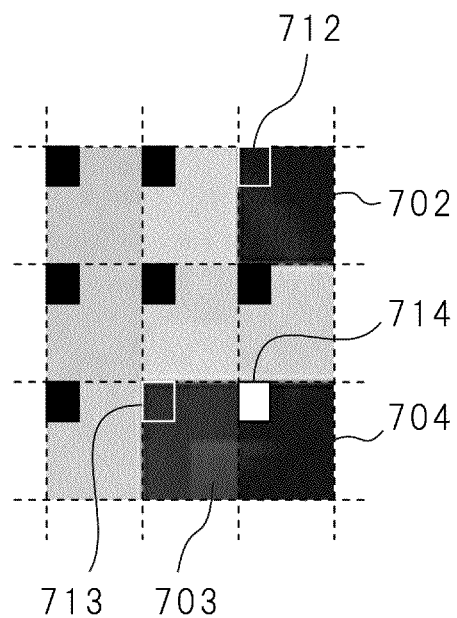
FIG. 7B is a diagram illustrating one example of a result of judgment about pixel value conversion for each minimal region in the encrypted image depicted in FIG. 7A.

FIG. 7A is a diagram illustrating one example of an encrypted image produced by scrambling and minimal regions defined in respective blocks. FIG. 7B is a diagram illustrating one example of a result of conversion about pixel value conversion for each minimal region in the encrypted image depicted in FIG. 7A.

An encrypted image 700 depicted in FIG. 7A and FIG. 7B is divided into three blocks vertically and three blocks horizontally. The boundaries of the blocks are represented by dotted lines. In the upper left end of each of the blocks, a minimal region is defined. The minimal regions are each surrounded by solid lines. In this example, three blocks 702 to 704 are darker than the other blocks. In this example, the difference between the pixel values of a minimal region 712 of the block 702 and the pixel values of the block adjacent to the region 712 on the left side thereof is large. Therefore, as depicted in FIG. 7B, the pixel values of the minimal region 712 are not converted. Similarly, the differences between the pixel values of a minimal region 713 of the block 703 and the pixel values of the blocks adjacent to the region 713 on the left side thereof and on the upper side thereof are large. Therefore, as depicted in FIG. 7B, the pixel values of the minimal region 713 are not converted.

By contrast, since the block 703 adjacent to the minimal region 714 of the block 704 on the left side thereof is also dark as the minimal region 714 is, it is difficult to detect the boundary between the block 703 and the block 704. In addition, the block 703 is relatively dark. Accordingly, as depicted in FIG. 7B, the pixel values of the minimal region 714 are converted so that the corresponding pixels would increase brightness. Regarding the other blocks, e.g., the block in the middle, the difference in pixel value between the block and the blocks adjacent to the minimal region of the block is small, and the adjacent blocks are relatively luminous. Therefore, as depicted in FIG. 7B, the pixel values of the minimal region of each of the other blocks are converted so that the corresponding pixels would become darker. As has been described above, according to this embodiment, the pixel value converting unit 25 needs not to perform pixel value conversion on all the blocks.

The processing unit 14 stores, in the storage unit 13, the encrypted image produced as described above. Alternatively, the processing unit 14 may output the encrypted image to other apparatus via the interface unit 11, or may print the encrypted image on a medium by using a device such as a printer.

Figure 8:
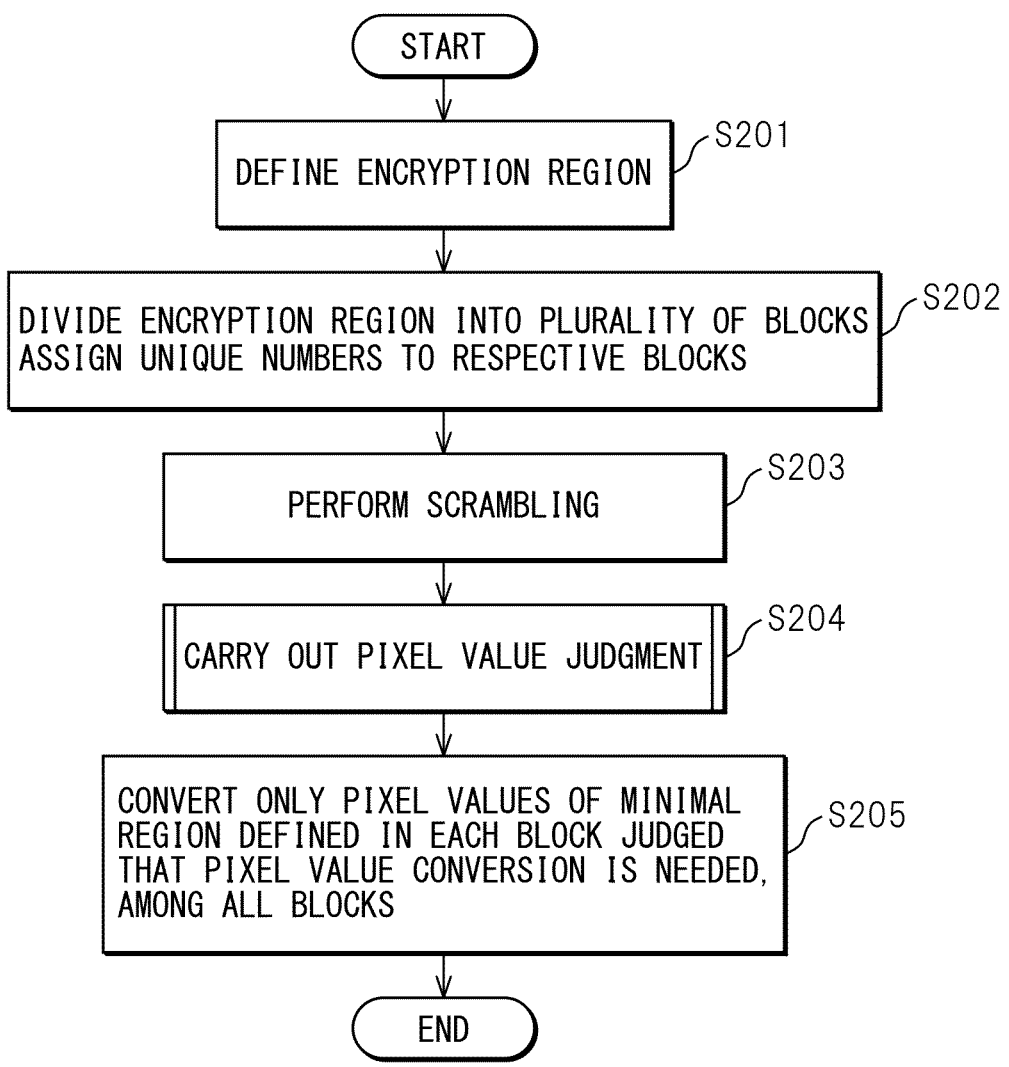
FIG. 8 is an operation flowchart illustrating an image encryption process under the control of a computer program executed on the processing unit of the image processing apparatus.

FIG. 8 is an operation flowchart illustrating an image encryption process under the control of a computer program executed on the processing unit 14.

The region specifying unit 21 of the processing unit 14 defines an encryption region in a source image to be encrypted (step S201). Then, the region specifying unit 21 notifies the dividing unit 22 in the processing unit 14 of information indicating the encryption region. The dividing unit 22 divides the encryption region into a plurality of blocks, which each serve as a unit when scrambling is performed, and assigns unique numbers to the respective blocks (step S202). Then, the dividing unit 22 notifies the scrambling unit 23 in the processing unit 14 of information indicating the ranges of the respective blocks or the boundaries between the blocks as well as the numbers assigned to the respective blocks. The scrambling unit 23 performs scrambling to rearrange the blocks in the encryption region according to the rearrangement rule determined by using the encryption key (step S203). Thereafter, the scrambling unit 23 passes the encrypted image produced by the scrambling, to the pixel value judging unit 24 in the processing unit 14.

The pixel value judging unit 24 carries out, for each of the blocks, the above-described pixel value judging process on the encrypted image (step S204). Then, the pixel value judging unit 24 notifies the pixel value converting unit 25 in the processing unit 14 of a flag indicating whether or not the pixel values of the minimal region set for each of the blocks are to be converted and whether or not the pixel values are to be converted so that the corresponding pixels would increase brightness when pixel value conversion is to be performed. On the basis of the flag, the pixel value converting unit 25 converts only the pixel values of the minimal region defined in each of the blocks determined to be subjected to pixel value conversion (step S205). Thereafter, the processing unit 14 terminates the image encryption process. In this operation, a plurality of encryption regions may be defined in one image. Such being the case, the processing unit 14 carries out the process in steps S202 to S205, for each of the encryption regions.

As has been described above, the image processing apparatus according to the first embodiment checks the difference in pixel value between two small regions adjacent to each other having a block boundary therebetween in an encryption region after scrambling. Then, only for each target block whose difference is small, the image processing apparatus converts the pixel values of the small area in the block, and uses the pixels subjected to pixel value conversion as a block position detection marker. As just described, the image processing apparatus does not convert pixel values for each block whose position is detectable without being subjected to pixel value conversion. Further, as for each block to be subjected to pixel value conversion, only a small range is defined as the region on which the image processing apparatus performs pixel value conversion. Consequently, the image processing apparatus enables a decryption apparatus to detect each block position while being capable of suppressing the degradation of the image quality of a decrypted image produced by decrypting an encrypted image.

Next, an image processing apparatus according to a second embodiment will be described. The image processing apparatus according to the second embodiment compares a minimal region of each block after scrambling, with an adjacent region that is horizontally adjacent to the minimal region and an adjacent region that is vertically adjacent to the minimal region, individually, and judges whether or not to convert the pixel values of the minimal region, on the basis of the comparison results.

The image processing apparatus according to the second embodiment differs from the image processing apparatus according to the first embodiment, in the process carried out by the pixel value judging unit of the processing unit. The following description therefore deals with the process carried out by the pixel value judging unit and related units. The details of the other components of the image processing apparatus can be found in the description of the corresponding components in the first embodiment.

Figure 9:
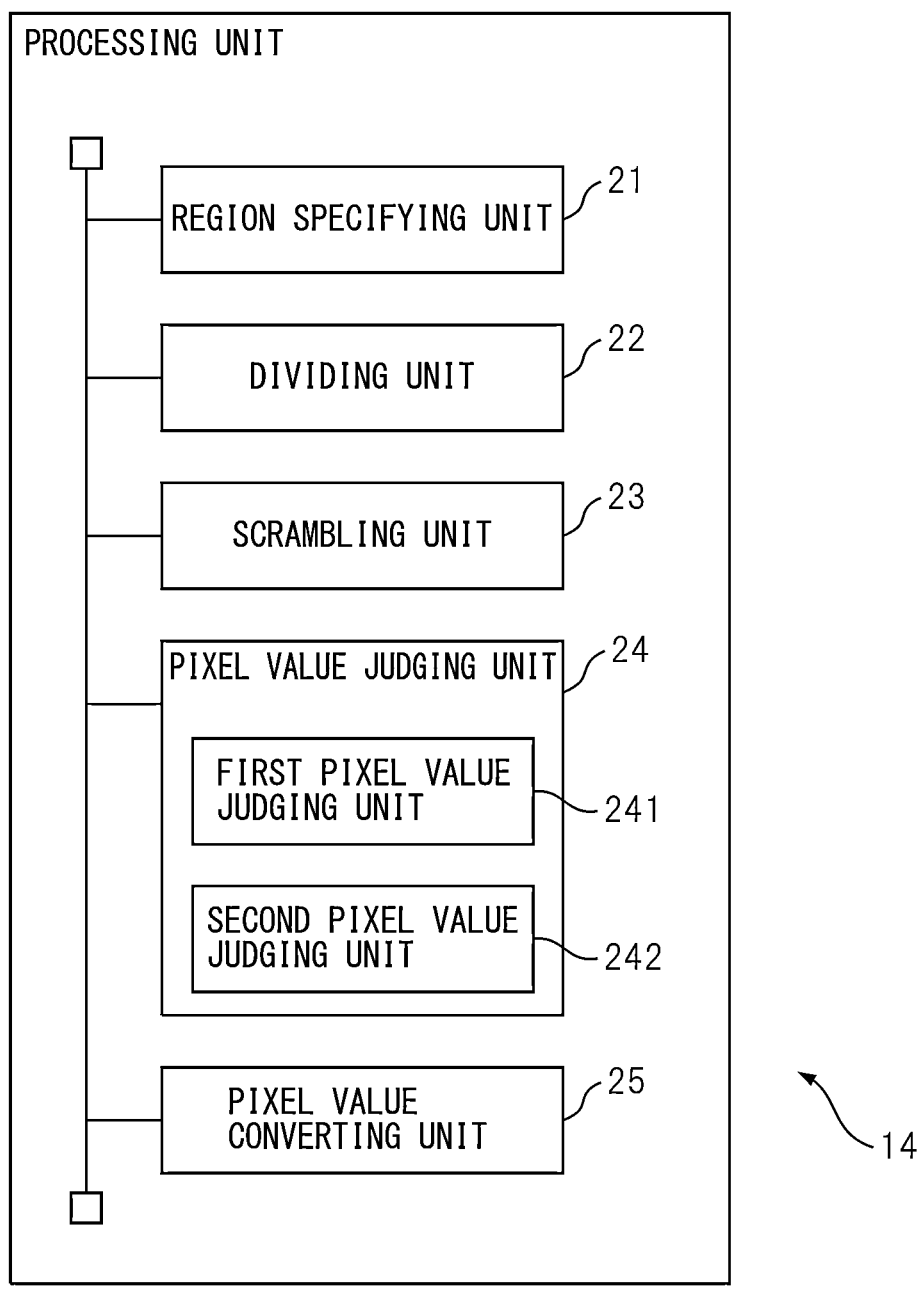
FIG. 9 is a block diagram illustrating the functions of a processing unit of an image processing apparatus according to a second embodiment.

FIG. 9 is a block diagram illustrating the functions of a processing unit 14 of the image processing apparatus according to the second embodiment. The processing unit 14 includes a region specifying unit 21, a dividing unit 22, a scrambling unit 23, a pixel value judging unit 24, and a pixel value converting unit 25. The pixel value judging unit 24 includes a first pixel value judging unit 241 and a second pixel value judging unit 242.

The first pixel value judging unit 241 compares, for each block after scrambling, the statistically representative value of the pixel values of a minimal region and the statistically representative value of the pixel values of a first adjacent region, which is horizontally adjacent to the minimal region having a block boundary therebetween.

Figure 10:
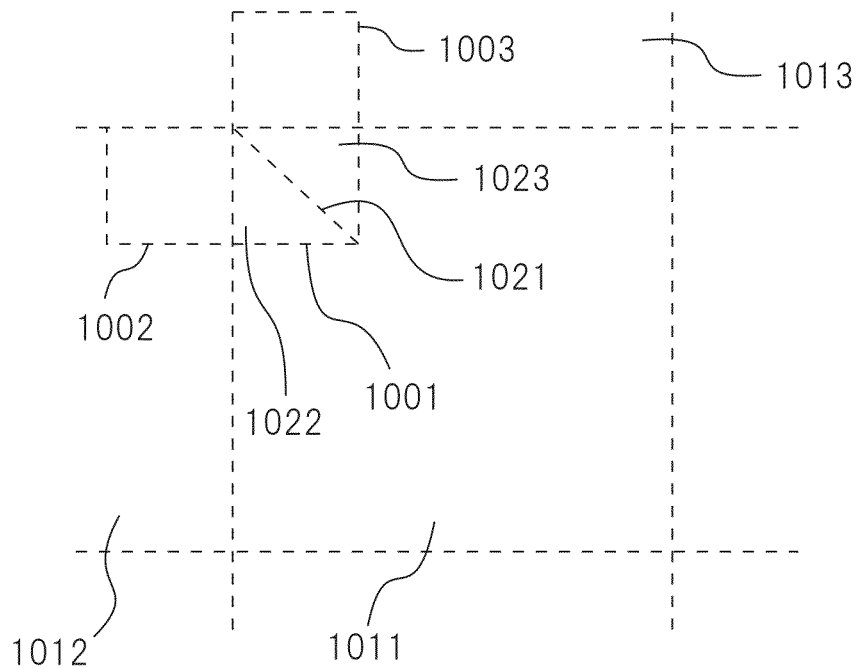
FIG. 10 is a diagram illustrating one example of the arrangement of a minimal region and adjacent regions according to the second embodiment.

FIG. 10 is a diagram illustrating an example of the arrangement of a minimal region and adjacent regions according to the second embodiment. In FIG. 10, a minimal region 1001 is defined at the upper left end corner of a target block 1011. In this case, a first adjacent region 1002 is adjacent to the minimal region 1001 at the left end thereof, and is included in a block 1012 adjacent to the target block 1011 on the left side thereof. The minimal region 1001 may be divided into two equal smaller regions 1022 and 1023 by a line 1021 that is equally distant from the left end and the upper end of the minimal region 1001, and thereby the first pixel value judging unit 241 may calculate the statistically representative value of the pixel values in the small region 1022 adjacent to the adjacent region 1002. In such a case, the pixels located on the line 1021 may be considered to be included in both the first smaller region and the second smaller region, or to be included in neither the first smaller region nor the second smaller region.

The first pixel value judging unit 241 judges that the statistically representative value of the pixel values of the minimal region differs from the statistically representative value of the pixel values of the first adjacent region when the statistically representative values satisfy the condition represented by the following equation.

$$|A0-B| \geq Th00 \quad (5)$$

In equation (5), A0 denotes the statistically representative value of the pixel values of the minimal region. The first pixel value judging unit 241 may calculate the statistically representative value A0 in consideration only of a partial region of the minimal region instead of the entire minimal region, the partial region being adjacent to the first adjacent region such as the smaller region 1022 depicted in FIG. 10, for example. Further, B denotes the statistically representative value of the pixel values of the first adjacent region. In addition, Th00 denotes a threshold value. The threshold value Th00 is set at a value similar to the threshold value Th0.

The second pixel value judging unit 242 compares, for each block after scrambling, the statistically representative value of the pixel values of the minimal region and the statistically representative value of the pixel values of a second adjacent region, which is vertically adjacent to the minimal region having a block boundary therebetween.

Referring to FIG. 10 again, a second adjacent region 1003 is adjacent to the minimal region 1001 at the upper end thereof, and is included in a block 1013 adjacent to the target block 1011 on the upper side thereof. The second pixel value judging unit 242 may calculate the statistically representative value of the pixel values in the smaller region 1023, which is adjacent to the adjacent region 1003, of the two equal smaller regions 1022 and 1023 defined by dividing the minimal region 1001 by the line 1021 that is equally distant from the left end and the upper end of the minimal region 1001.

The second pixel value judging unit 242 judges that the statistically representative value of the pixel values of the minimal region differs from the statistically representative value of the pixel values of the second adjacent region when the statistically representative values satisfy the condition represented by equation (5). In this case, A0 denotes the statistically representative value of the pixel values of the minimal region. The second pixel value judging unit 242, as the first pixel value judging unit 241, may calculate the statistically representative value A0 in consideration only of a partial region of the minimal region instead of the entire minimal region, the partial region being adjacent to the second adjacent region such as the smaller region 1023 depicted in FIG. 10, for example. Further, B denotes the statistically representative value of the pixel values of the second adjacent region.

The pixel value judging unit 24 sets a flag indicating that pixel value conversion is not to be performed on the minimal region, when at least one of the first pixel value judging unit 241 and the second pixel value judging unit 242 judges that the statistically representative value of the pixel values of the minimal region differs from the statistically representative value of the pixel values of the corresponding adjacent region. By contrast, when both the first pixel value judging unit 241 and the second pixel value judging unit 242 judge that the statistically representative value of the pixel values of the minimal region does not differ from the statistically representative value of the pixel values of the corresponding adjacent region, the pixel value judging unit 24 sets a flag indicating that pixel value conversion is to be performed on the minimal region.

When setting, for the minimal region, the flag indicating that pixel value conversion is to be performed, the pixel value judging unit 24 also judges whether or not to convert the pixel values of the minimal region so that the corresponding pixels would increase brightness, according to the process in steps S104 to S106 in FIG. 6. In the judgment, the pixel value judging unit 24 may judge whether or not the first and second adjacent regions are luminous, according to equation (4). Alternatively, the pixel value judging unit 24 may judge whether or not to convert the pixel values of the minimal region so that the corresponding pixels would increase brightness, on the basis of the pixel values included in the target adjacent region which is one of the first and second adjacent regions. For example, suppose that a higher pixel value indicates a more luminous pixel (i.e., a whiter pixel). In this case, the pixel value judging unit 24 judges that the target adjacent region is luminous, when the statistically representative value of the pixel values of the target adjacent region satisfies the condition represented by the following equation.

$$B > Th11 \qquad (6)$$

In equation (6), B denotes the statistically representative value of the pixel values of the target adjacent region, and Th11 denotes a threshold value. The threshold value Th11 is determined similarly to the threshold value Th1 in the first embodiment, for example.

The pixel value judging unit 24 sets, for the minimal region, a flag indicating that the pixel values are to be converted so that the corresponding pixels would become darker, when the target adjacent region is luminous. By contrast, when the condition represented by equation (6) is not satisfied, i.e., the target adjacent region is dark, the pixel value judging unit 24 sets, for the minimal region, a flag indicating that the pixel values are to be converted so that the corresponding pixels would increase brightness.

As has been described above, when there is a difference in pixel value between the minimal region in each block after scrambling and at least one of the adjacent region horizontally adjacent to the minimal region and the adjacent region vertically adjacent to the minimal, the image processing apparatus according to the second embodiment does not convert the pixel values of the minimal region. In this way, the image processing apparatus according to the second embodiment can further reduce the number of pixels to be subjected to pixel value conversion, and can thereby suppress the degradation of image quality of a decrypted image.

According to a modified example, the pixel value converting unit may judge the pixel values of the minimal region determined to be subjected to pixel value conversion, by performing a shift operation on the statistically representative value of the pixel values of each adjacent region that is adjacent to the minimal region. For example, when each pixel value is expressed by a value in the range from 0 to 255, the pixel value converting unit may determine, as each pixel value of the minimal region, a value obtained by adding a value corresponding to half the maximum pixel value of the adjacent region, i.e., 127, to the average pixel value of the adjacent region. When the resultant value exceeds 255, the pixel value converting unit determines, as each pixel value of the minimal region, a value obtained by subtracting 256 from the resultant value. In this case, the pixel value judging unit may omit steps S104 to S106 in the pixel value judgment process illustrated in FIG. 6, and may instead set a flag indicating that pixel value conversion is to be performed on the minimal region.

According to another modified example, the pixel value converting unit may determine each pixel value after conversion for the minimal region of each block determined to be subjected to pixel value conversion so that the difference between each pixel value of the minimal region after the conversion and the statistically representative value of the pixel values of each adjacent region would be larger than the difference between each pixel value of the minimal region before the conversion and the statistically representative value of the pixel values of the adjacent region. For example, the pixel value converting unit may determine each pixel value of the minimal region after conversion on the basis of the statistically representative value of the pixel values of the minimal region. In this case, when the statistically representative value of the pixel values of the minimal region indicates that the pixels in the minimal region are more luminous than those of each adjacent region, the pixel value converting unit determines, as each pixel value of the minimal region after the conversion, a value obtained by adding a predetermined positive offset value to the statistically representative value of the pixel values of the minimal region. By contrast, when the statistically representative value of the pixel values of the minimal region indicates that the pixels in the minimal region are darker than those of each adjacent region, the pixel value converting unit determines, as the pixel value of the minimal region after the conversion, a value obtained by subtracting the predetermined offset value from the statistically representative value of the pixel values of the minimal region. Further, the pixel value conversion unit may set the predetermined offset value so that the smaller the absolute value of the difference between the statistically representative value of the pixel values of the minimal region and the statistically representative value of the pixel values of the adjacent region is, the larger the predetermined offset value would be.

According to still another modified example, the processing unit may add, to an encrypted image, encryption region detection markers indicating the position and the range of each encryption region, after the specifying of the encryption region, scrambling, or the performing of pixel value conversion on the corresponding block by the pixel value converting unit. The processing unit adds the encryption region detection marker to a position close to each of the corners of the encryption region, for example. The encryption region detection markers each have a shape and a size that are known to a decryption apparatus, and may be a pattern in which black regions and white regions each having a predetermined width are alternately arranged, for example.

Next, description will be given of a decryption apparatus that decrypts an encrypted image created by the image processing apparatus according to each one of the above embodiments and the modified examples of the embodiments.

The decryption apparatus according to this embodiment, as the image processing unit depicted in FIG. 1, includes an interface unit, a user interface unit, a storage unit, and a processing unit. The decryption apparatus acquires an encrypted image from other apparatus via the interface unit. The other apparatus may be a device, e.g., a digital camera or a mobile phone with a built-in camera, that creates a digitalized encrypted image by capturing the encrypted image printed on a medium. Alternatively, the other apparatus may be a computer connected to the decryption apparatus via a communication network. The processing unit of the decryption apparatus produces a decrypted image by decrypting the encrypted image, and thereafter causes the user interface unit to display the decrypted image or outputs the decrypted image to other apparatus via the interface unit.

Figure 11:
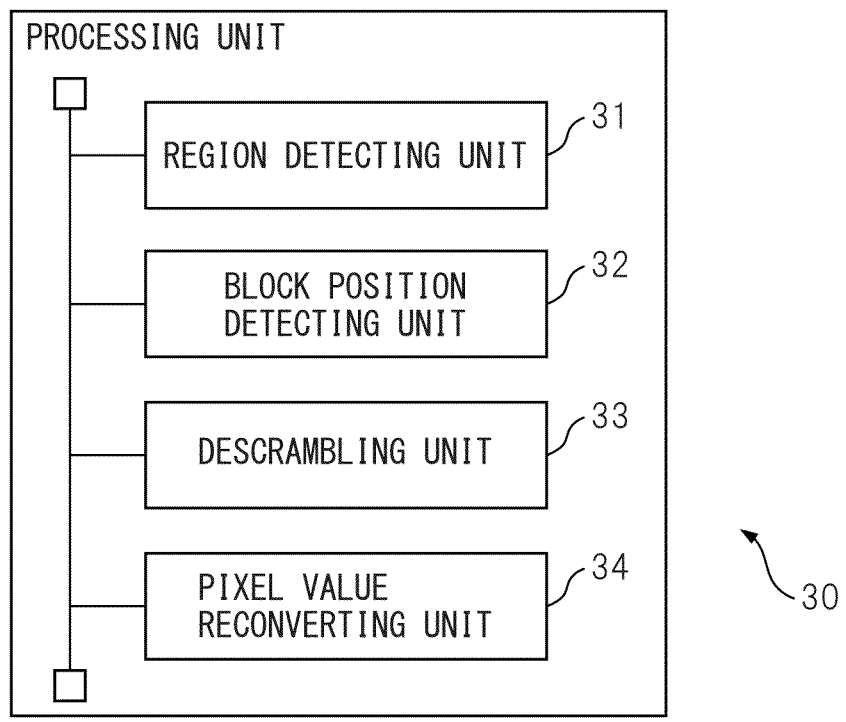
FIG. 11 is a block diagram illustrating the functions that a processing unit of a decryption apparatus implements for a process of decrypting an encrypted image.

FIG. 11 is a block diagram illustrating the functions that the processing unit of the decryption apparatus implements for the process of decrypting an encrypted image. The processing unit 30 includes a region detecting unit 31, a block position detecting unit 32, a descrambling unit 33, and a pixel value reconverting unit 34. These units constituting the processing unit 30 are functional modules implemented by executing a computer program on a processor incorporated in the processing unit 30. These units of the processing unit 30 may be incorporated in the decryption apparatus as circuits for implementing the functions of the respective units or an integrated circuit with these circuits integrated therein.

The region detecting unit 31 detects an encryption region. For example, when a user specifies a range in an encrypted image displayed on a display device of the user interface, by operating a pointing device such as a mouse while looking at the encrypted image, the region detecting unit 31 acquires information indicating the specified range from the device. Then, the region detecting unit 31 defines the specified range as the encryption region. Alternatively, when encryption region detection markers are added to the encrypted image, the region detecting unit 31 may detect the encryption region detection markers by using a general image recognition technique such as pattern matching or graphics connectivity analysis. In this case, the region detecting unit 31 specifies the encryption region on the basis of the positional relationship between the detected markers and the encryption region. The region detecting unit 31 notifies the block position detecting unit 32 of information indicating the encryption region, e.g., the coordinates of the upper left end and the lower right end of the encryption region.

The block position detecting unit 32 detects the position of each block on the basis of the encryption region detected by the region detecting unit 31. For the detection, the block position detecting unit 32 detects the boundary between each two corresponding adjacent blocks or each minimal region converted for pixel value by, for example, the image processing apparatus.

The block position detecting unit 32 produces a blurred image by filtering the encryption region with a median filter having a size larger than the minimal region, for example. The median filter is a filter that outputs, as the value of a pixel located in the middle of the median filter, the median value of the pixel values of a region to which the filter is applied. In this example, when the minimal region is consisted of only one pixel or two-by-two pixels, the median filter has a size of three-by-three pixels or four-by-four pixels. In general, the distribution of the pixel values of each block tends to fall within a small range. As a result, when the pixel values of the minimal region are converted, the pixel values are likely to be considerably different from the average value or the median value of the pixel values of the block in which the minimal region is included. For this reason, it is highly possible that the pixel values of the minimal region converted for pixel value would be replaced with the values of pixels neighboring the minimal region, when the median filter is applied to the encryption region.

Therefore, the block position detecting unit 32 produces a difference image by obtaining the absolute value of the value obtained by subtracting the value of each of the pixels in the blurred image, from the value of the corresponding pixel in the original encryption region. In the difference image, the pixels converted for pixel value each have a relatively high pixel value, while pixels not converted for the pixel value each have a relatively low pixel value. As a result, each minimal region including the pixels converted for pixel value appears in the difference image.

Further, the block position detecting unit 32 produces an edge image by filtering the blurred image with an edge detection filter. In general, since the pixel values of adjacent blocks are not correlated with each other in an encrypted image, the pixel values may have a large difference at the boundary between the adjacent blocks. Therefore, by applying the edge detection filter to the difference image, an edge image having relatively high pixel values at the boundary between each two adjacent blocks is obtained. Accordingly, the block position detecting unit 32 can easily detect each block position by analyzing such an edge image.

FIGS. 12A and 12B are each a diagram illustrating one example of the edge detection filter used by the block position detecting unit 32. An edge detection filter 1201 depicted in FIG. 12A is a filter for detecting vertical edges (i.e., edges having pixel values that vary in the horizontal direction). An edge detection filter 1202 depicted in FIG. 12B is a filter for detecting horizontal edges (i.e., edges having pixel values that vary in the vertical direction). In this embodiment, the block position detecting unit 32 produces a vertical edge image including vertical edges detected by applying the vertical edge detection filter to the blurred image, and also produces a horizontal edge image including horizontal edges detected by applying the horizontal edge detection filter to the blurred image. As each of the edge detection filters, a second derivative filter such as a Laplacian filter may be used, for example.

As has been described above, the pixels in each minimal region converted for pixel value have relatively high values in the difference image, while the pixels located at each block boundary where each two adjacent pixels have a large difference in pixel value have relatively high values in the edge image. By taking advantage of these features, the block position detecting unit 32 produces a synthetic image by adding the value of each pixel in the difference image and the value of the corresponding pixel in the vertical edge image. Then, the block position detecting unit 32 obtains, for each horizontal row, the number of pixels each of which has a pixel value no lower than a predetermined positive threshold value, and thereby obtains a histogram of the numbers of the corresponding pixels of the respective rows. In this case, the histogram includes, in a certain cycle, a row having a larger number of pixels than neighboring rows. By using the histogram, the block position detecting unit 32 detects the rows each having a large number of pixels, as vertical block boundaries.

Similarly, the block position detecting unit 32 produces a synthetic image by adding the value of each pixel in the difference image and the value of the corresponding pixel in the horizontal edge image. Then, the block position detecting unit 32 obtains, for each vertical row, the number of pixels each of which has a pixel value no lower than the predetermined positive threshold value, and thereby obtains a histogram of the numbers of the corresponding pixels of the respective rows. By using the histogram, the block position detecting unit 32 detects, as horizontal block boundaries, the each row having a large number of pixels and found in a certain cycle.

The block position detecting unit 32 notifies the descrambling unit 33 of the coordinates of the horizontal and vertical boundaries of each of the blocks on the encrypted image.

The descrambling unit 33 performs descrambling on each encryption region. By using the encryption key and equation (1) for transforming each block position that are used by the image processing apparatus to perform scrambling, the descrambling unit 33 determines an original position y of each block in the encryption region, the block having a position x as the position of the position-transformed block after the scrambling. Then, the descrambling unit 33 transforms the position of each position-transformed block on the encrypted image back to the original position of the position-transformed block, thereby generating a decrypted image in which the position of each position-transformed block is the same as that in the source image.

The pixel value reconverting unit 34 reconverts the pixel values of the minimal region of each block on the decrypted image produced by descrambling the encrypted image. For this reconversion, the pixel value reconverting unit 34 may use any one of various interpolation filters for interpolating the value of a target pixel to be interpolated by using the values of neighboring pixels of the target pixel, for example. The pixel value reconverting unit 34 uses a filter for obtaining the weighted average of the values of the neighboring pixels by multiplying a weighting factor to each of the values of the neighboring pixels according to the following equation. The closer the neighboring pixel is to the target pixel, the larger the weighting factor becomes.

$$Vp = \sum_{i=0}^{k-1}(Vn_i/r_i) \Big/ \sum_{i=0}^{k-1}(1/r_i) \qquad (7)$$

In equation (7), Vp denotes an estimated value of the original value of a target pixel P in the minimal region, and $Vn_i$ (i=0, 1, 2, ..., k−1) denotes the pixel value of a neighboring pixel $n_i$ of the target pixel in the decrypted image. In addition, $r_i$ denotes a value representing the distance from the target pixel P to the neighboring pixel $n_i$.

FIG. 13 is a diagram illustrating one example of the interpolation filter when k=8 in equation (7). An interpolation filter 1300 is a filter for calculating an estimated value Vp of the target pixel P to be interpolated, by using the values of eight neighboring pixels $n_0$ to $n_7$ of the target pixel P. In this example, the distances from the target pixel P to the respective neighboring pixels $n_0$ to $n_7$ are defined as follows, for example.

$$r0=r2=r4=r6=1$$

$$r1=r3=r5=r7=2$$

In this case, the estimated value Vp of the target pixel P is calculated as follows.

$$Vp=(2(Vn_0+Vn_2+Vn_4+Vn_6)+(Vn_1+Vn_3+Vn_5+Vn_7))/12$$

The pixel value reconverting unit 34 may also use the pixel value itself of the target pixel P in the decrypted image before pixel value reconversion, in order to obtain the estimated value of the original value of the target pixel P. For example, the pixel value reconverting unit 34 may use, as the estimated value of the target pixel, the arithmetic average value of the pixel values of a region having a size of three-by-three pixels and having the target pixel in the middle.

When the decryption apparatus decrypts an image obtained by digitalizing an encrypted image printed on a medium, the original information on each minimal region subjected to pixel value conversion is not indicated in the digitalized image. Accordingly, it is difficult for the decryption apparatus to obtain the original value of each pixel in the minimal region simply by inverting the value of the pixel of the minimal region. However, in the decrypted image obtained by decrypting the digitalized image by descrambling, the values of the pixels neighboring the minimal region have relatively high correlation with the original values of the pixels in the minimal region. For this reason, the decryption apparatus can estimate the original value of each pixel subjected to pixel value conversion, by performing interpolation as described above. The pixel value reconverting unit 34 causes the display device of the user interface unit to display the decrypted image produced by reconverting the pixel values of each minimal region of each block. Alternatively, the pixel value reconverting unit 34 may output the decrypted image to another apparatus via the interface unit, or may store the decrypted image in the storage unit.

In addition, the computer program for causing a computer to implement the various functions of the processing unit in the image processing apparatus according to each one of the above embodiments and the modified examples of the embodiments may be provided in the form of computer readable recording medium, such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alternations could be made hereto without departing from the spirit and scope of the invention.

What is claimed is:

1. An image processing apparatus comprising:
a hardware processor configured to
divide at least one region on a digitalized image into a plurality of blocks;
produce an encrypted image by rearranging the plurality of blocks according to a predetermined rule;
calculate, for each of the plurality of blocks on the encrypted image, a statistically representative value of a pixel value of a pixel in a first region included in the block based on either a luminance value of the pixel included in the first region or at least one of a plurality of color components of the pixel;
judge, for each of the plurality of blocks on the encrypted image, whether or not a difference between the statistically representative value of the pixel value of the first region and a statistically representative value of a pixel value of a pixel in a second region is not smaller than a first predetermined value, the second region being included in a block adjacent to the block and being adjacent to the first region; and
convert the pixel value of the first region included in each block having the difference smaller than the first predetermined value among the plurality of blocks on the encrypted image, while not converting the pixel value of the first region included in each block having the difference which is not smaller than the first predetermined value among the plurality of blocks.

2. The image processing apparatus according to claim 1, wherein each of the plurality of blocks has a rectangular shape, and
the first region is defined at any one of four corners of the block including the first region, and the second region includes a first adjacent region which is adjacent to the first region in a first direction and a second adjacent region which is adjacent to the first region in a second direction orthogonal to the first direction, and wherein
the judging whether or not the difference is not smaller than the first predetermined value includes:
comparing, with the first predetermined value, a first difference between the statistically representative value of the pixel value of the first region and a statistically representative value of a pixel value of the first adjacent region, and comparing, with the first predetermined value, a second difference between the statistically representative value of the pixel value of the first region and a statistically representative value of a pixel value of the second adjacent region, and the converting of the pixel value of the first region does not convert the pixel value of the first region in each of the plurality of blocks which has at least one of the first difference and the second difference which is not smaller than the first predetermined value, while converting the pixel value of the first region in each of the plurality of blocks which has both the first difference and the second difference smaller than the first predetermined value.

3. The image processing apparatus according to claim 1, wherein, for each block whose difference between the statistically representative value of the pixel value of the first region and the statistically representative value of the pixel value of the second region is smaller than the first predetermined value among the plurality of blocks on the encrypted image, the converting of the pixel value of the first region converts either a luminance value of the pixel included in the first region or at least one of a plurality of color components of the pixel, to a value determined on the basis of the statistically representative value of the pixel value of the second region.

4. The image processing apparatus according to claim 3, wherein, for each block having the difference smaller than the first predetermined value among the plurality of blocks on the encrypted image, the converting of the pixel value of the first region converts either the luminance value of the pixel included in the first region or at least one of the plurality of color components of the pixel, to a value lower than a second predetermined value when the statistically representative value of the pixel value of the second region is not smaller than the second predetermined value, while converting either the luminance value of the pixel included in the first region or at least one of the plurality of color components of the pixel, to a value higher than the second predetermined value when the statistically representative value of the pixel value of the second region is lower than the second predetermined value.

5. The image processing apparatus according to claim 1, wherein, for each block whose difference between the statistically representative value of the pixel value of the first region and the statistically representative value of the pixel value of the second region is smaller than the first predetermined value among the plurality of blocks on the encrypted image, the converting of the pixel value of the first region converts either a luminance value of the pixel included in the first region or at least one of a plurality of color components of the pixel, to a value so that a difference between the value of the pixel after the conversion and the statistically representative value of the pixel value of the second region is larger than the difference between the statistically representative value of the pixel value of the first region and the statistically representative value of the pixel value of the second region.

6. An image processing method comprising:
dividing, by a processor, at least one region on a digitalized image into a plurality of blocks;
producing, by the processor, an encrypted image by rearranging the plurality of blocks according to a predetermined rule;
calculating, by the processor, for each of the plurality of blocks on the encrypted image, a statistically representative value of a pixel value of a pixel in a first region included in the block based on either a luminance value of the pixel included in the first region or at least one of a plurality of color components of the pixel;
judging, by the processor, for each of the plurality of blocks on the encrypted image, whether or not a difference between the statistically representative value of the pixel value of the first region and a statistically representative value of a pixel value of a pixel in a second region is not smaller than a predetermined value, the second region being included in a block adjacent to the block and being adjacent to the first region; and
converting, by the processor, the pixel value of the first region included in each block having the difference smaller than the predetermined value among the plurality of blocks on the encrypted image, while not converting the pixel value of the first region included in each block having the difference which is not smaller than the predetermined value among the plurality of blocks.

7. The image processing method according to claim 6, wherein each of the plurality of blocks has a rectangular shape, and
the first region is defined at any one of four corners of the block including the first region, and the second region includes a first adjacent region which is adjacent to the first region in a first direction and a second adjacent region which is adjacent to the first region in a second direction orthogonal to the first direction, and wherein
the judging whether or not the difference between the statistically representative value for the first region and the statistically representative value for the second region is not smaller than the predetermined value, compares, with the first predetermined value, a first difference between the statistically representative value of the pixel value of the first region and a statistically representative value of a pixel value of the first adjacent region, and compares, with the first predetermined value, a second difference between the statistically representative value of the pixel value of the first region and a statistically representative value of a pixel value of the second adjacent region, and
the converting of the pixel value of the first region does not convert the pixel value of the first region in each of the plurality of blocks which has at least one of the first difference and the second difference which is not smaller than the first predetermined value, while converting the pixel value of the first region in each of the plurality of blocks which has both the first difference and the second difference smaller than the first predetermined value.

8. The image processing method according to claim 6, wherein, for each block whose difference between the statistically representative value of the pixel value of the first region and the statistically representative value of the pixel value of the second region is smaller than the first predetermined value among the plurality of blocks on the encrypted image, the converting of the pixel value of the first region converts either a luminance value of the pixel included in the first region or at least one of a plurality of color components of the pixel, to a value determined on the basis of the statistically representative value of the pixel value of the second region.

9. The image processing method according to claim 8, wherein, for each block having the difference smaller than the first predetermined value among the plurality of blocks on the encrypted image, the converting the pixel value of the first region converts either the luminance value of the pixel included in the first region or at least one of the plurality of color components of the pixel, to a value lower than a second predetermined value when the statistically representative value of the pixel value of the second region is not smaller than the second predetermined value, while converting either the luminance value of the pixel included in the first region or at least one of the plurality of color components of the pixel, to a value higher than the second predetermined value when the statistically representative value of the pixel value of the second region is lower than the second predetermined value.

10. The image processing method according to claim 6, wherein, for each block whose difference between the statistically representative value of the pixel value of the first region and the statistically representative value of the pixel value of the second region is smaller than the first predetermined value among the plurality of blocks on the encrypted image, the converting of the pixel value of the first region converts either a luminance value of the pixel included in the first region or at least one of a plurality of color components of the pixel, to a value so that a difference between the value of the pixel after the conversion and the statistically representative value of the pixel value of the second region is larger than the difference between the statistically representative value of the pixel value of the first region and the statistically representative value of the pixel value of the second region.

11. A non-transitory computer readable recording medium having an image processing computer program recorded thereon for causing a computer to execute:

dividing at least one region on a digitalized image into a plurality of blocks;

producing an encrypted image by rearranging the plurality of blocks according to a predetermined rule;

calculating, for each of the plurality of blocks on the encrypted image, a statistically representative value of a pixel value of a pixel in a first region included in the block based on either a luminance value of the pixel included in the first region or at least one of a plurality of color components of the pixel;

judging for each of the plurality of blocks on the encrypted image, whether or not a difference between the statistically representative value of the pixel value of the first region and a statistically representative value of a pixel value of a pixel in a second region is not smaller than a predetermined value, the second region being included in a block adjacent to the block and being adjacent to the first region; and converting the pixel value of the first region included in each block having the difference smaller than the predetermined value among the plurality of blocks on the encrypted image, while not converting the pixel value of the first region included in each block having the difference which is not smaller than the predetermined value among the plurality of blocks.

\* \* \* \* \*